United States Patent [19]

Kamei

[11] Patent Number: 5,257,074
[45] Date of Patent: Oct. 26, 1993

[54] IMAGE FORMING APPARATUS
[75] Inventor: Masafumi Kamei, Shakujii, Japan
[73] Assignee: Canon Kabushiki Kaisha, Tokyo, Japan
[21] Appl. No.: 866,194
[22] Filed: Apr. 9, 1992
[30] Foreign Application Priority Data
  Apr. 9, 1991 [JP] Japan .................. 3-103386
[51] Int. Cl.⁵ .......................... G03G 15/04
[52] U.S. Cl. ..................... 355/244; 355/202; 382/13; 395/110
[58] Field of Search ............. 355/202, 209, 210, 200, 355/244; 358/300; 346/160, 153.1; 382/1, 9, 10, 13; 395/110; 400/61

[56] References Cited
U.S. PATENT DOCUMENTS

| | | | |
|---|---|---|---|
| 4,639,791 | 1/1987 | Masaki | 358/300 |
| 4,714,940 | 12/1987 | Inoue et al. | |
| 4,916,489 | 4/1990 | Takeda et al. | 355/210 |
| 4,931,882 | 6/1990 | Takeda et al. | 358/474 |
| 4,943,833 | 7/1990 | Fukushima | 355/326 |
| 4,953,225 | 8/1990 | Togawa et al. | 382/13 |
| 4,963,920 | 10/1990 | Fukushima | 355/40 |
| 4,989,042 | 1/1991 | Muramatsu et al. | 355/244 |
| 5,034,989 | 7/1991 | Loh | 382/13 |
| 5,108,206 | 4/1992 | Yoshida | 395/110 X |

Primary Examiner—R. L. Moses
Attorney, Agent, or Firm—Fitzpatrick, Cella, Harper & Scinto

[57] ABSTRACT

An image forming apparatus having an input section for inputting handwritten characters and a character recognition device for recognizing the character types in the handwritten characters inputted from the input section. Character pattern data is generated representing the character types recognized by the character recognizing device. A scanning device scans an original document image and forms an image produced by combining character pattern data generated by the generating device with the scanned image of the original document.

13 Claims, 10 Drawing Sheets

IMAGE FORMING APPARATUS

BACKGROUND OF THE INVENTION

1. Field of the Invention

The present invention relates to an image forming apparatus which is capable of obtaining an image produced by combining additional information with a document image.

2. Description of the Related Art

In the prior art, apparatuses for combining additional information with an image on a document and recording it have been disclosed in, for example, U.S. Pat. Nos. 4,943,833, 4,963,920, 4,714,940, 4,639,791, 4,916,489, 4,931,882, 4,989,042 and so on. In the above prior art, additional information is selected by using a digitizer or keys of an operation section. For example, the apparatus shown in FIG. 16 utilizes a digitizer.

However, when additional information is input in a conventional image forming apparatus, complicated operations must be performed. For example, characters must be searched in a character string on an editor and keys must be touched. The foregoing conventional apparatus cannot be effectively used because it has poor input efficiency. As a result, the likelihood of users to use the apparatus declines. Also, since character information which is entered beforehand is often excluded, for example, Japanese Kanji characters, the applications of an additional information input device are limited.

In addition, in the conventional image forming apparatus, character fonts which are prepared in the image forming apparatus beforehand can only be output as additional information. Consequently, unique characters, such as modified additional information, cannot be easily combined with an image on an original document.

SUMMARY OF THE INVENTION

The present invention provides an image forming apparatus which is capable of inputting desired characters as additional information onto a scanned original document by processing character information by pattern recognition.

The present invention also provides an image forming apparatus which is capable of inputting type fonts and graphic patterns as additional information by recognizing characters written in an original document generating image patterns.

According to one aspect of the present invention, an image forming apparatus includes inputting means for inputting handwritten characters, character recognition means for recognizing character types in the handwritten characters inputted from the input means, and generating means for generating character pattern data representing the character type recognized by the character recognition means. Scanning means are provided for scanning an original document and image forming means are provided for forming an image produced by combining character pattern generated by the generating means with an image of the original document scanned by the scanning means.

According to another aspect of the present invention, an image forming apparatus comprises reading means for reading an image of an original document on which characters are written, and character recognition means for recognizing character types in the characters written on the original document read by the reading means. Generating means are provided for generating image patterns on the basis of the character types recognized by the character recognizing means, and image forming means are provided for forming an image produced by combining an image of the original document read by the reading means other than recognized characters with image patterns generated by the generating means.

Objectives and advantages in addition to those discussed above shall be apparent to those skilled in the art from the description of the preferred embodiment of the invention which follows. In the description, reference is made to the accompanying drawings, which form a part hereof, and which illustrate an example of the invention. Such example, however, is not exhaustive of the various embodiments of the invention, and therefore reference is made to the appended claims for determining the scope of the invention.

DETAILED DESCRIPTION OF THE PREFERRED EMBODIMENT

Figure 1:
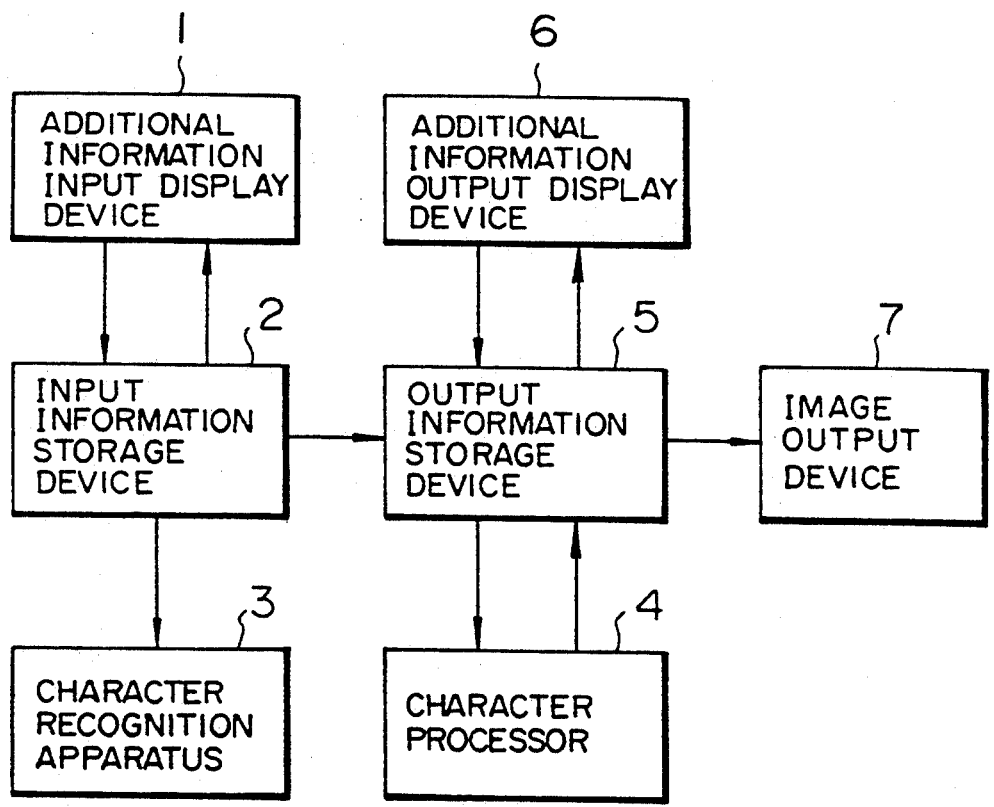
FIG. 1 is a block diagram which illustrates the construction of an image forming apparatus according to an embodiment of the present invention.

FIG. 1 is a block diagram which illustrates the construction of an image forming apparatus according to an embodiment of the present invention. Reference numeral 1 denotes an additional information input display device, in which a mode designation key for designating a handwriting input mode or the like, a handwriting input area, a handwriting input information display device, and the like are provided. Reference numeral 2 denotes an input information storage device for storing handwritten input information (character information) as image data. Reference numeral 3 denotes a character recognition apparatus, which analyzes image data stored in the input information storage device 2, performs a character recognition process and inputs the recognized type data to a character processor 4. The character recognition apparatus 3 has a ROM in which patterns of type font data are stored. This apparatus reads out type-font data patterns corresponding to the recognized character. The character processor 4 stores additional information output data, on which a kanji conversion process and a character modification process (a contour character modification process, a shadowed character modification process, a character magnification process or the like) have been performed on the basis of input type font data, in an output information storage device 5. Reference numeral 6 denotes an additional information output display device which displays additional information output data stored in the output information storage device 5. Reference numeral 7 denotes an image output device which outputs additional information, newly obtained by a series of operations, together with the image of the original document on a sheet of image output paper.

In the image forming apparatus constructed as described above, when desired additional information is input from the additional information input display device 1, image data corresponding to the additional information is stored in a storing means (the input information storage device 2 in this embodiment). An image output means such as image output device 7 additionally outputs the additional information based on the image data stored in the input information storage device 2 at a position designated for the original document image, thereby making it possible to combine a desired image or handwritten characters with the image of the original document.

When desired additional information is input, image data corresponding to the additional information is stored in storing means such as information storage device 2. Character recognizing means such as character recognition apparatus 3 analyzes data stored in the input information storage device 2 and generates the type font data of a recognized character. Image outputting means such as image output device 7 outputs additional information on the basis of the generated type font data at a position specified for the original document image, making it possible to add the type fonts of characters which are handwritten, as images, to the original document image.

Type font data of the input character analyzed and recognized by the character recognition apparatus 3 is displayed on a displaying means such as additional information input display device 1 or the like. Thus, the result of the character recognition process performed by the character recognition apparatus 3 is made visible to the person which has input it.

Character processing means such as character processor 4 performs a character conversion process on the basis of the type font data recognized by the character recognition apparatus 3, and outputs a plurality of selectable candidate character strings. When a desired candidate character string is selected by a selecting means, the image outputting means can additionally output the selected conversion characters at a position designated for the original document image.

The character processor 4 performs a magnification process on the recognized type font data according to a designated character size and generates additional information. Thus, the image outputting means can additionally output the desired magnified type font at a position designated for the original document image.

Figure 2:
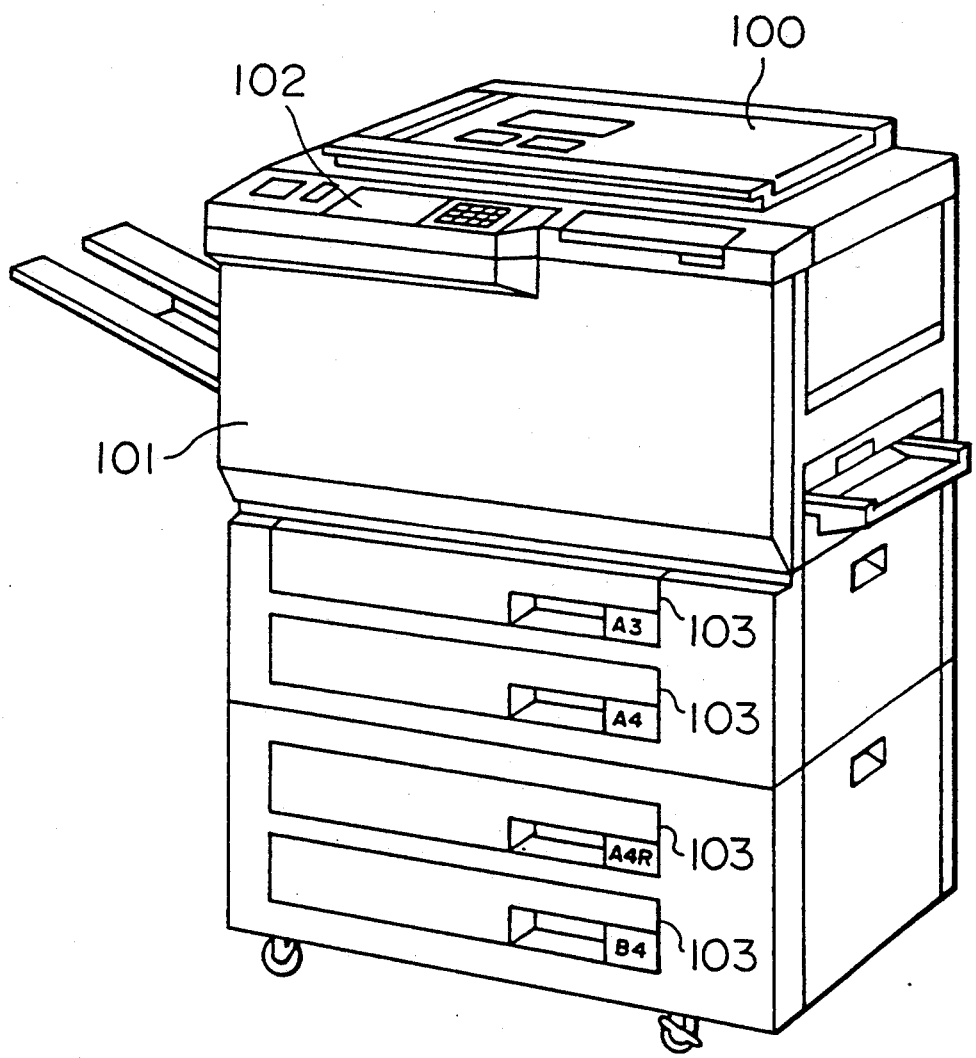
FIG. 2 is a perspective view illustrating the construction of the exterior of the image forming apparatus shown in FIG. 1.

FIG. 2 is a perspective view of the exterior of the image forming apparatus shown in FIG. 1, illustrating the construction thereof. Reference numeral 100 denotes an editor, onto which a point pen is applied when information on an original document image trimming coordinates or predetermined additional information is selected. Reference numeral 101 denotes a main body of the editor, which comprises an analog scanning system for projecting an ordinary original document image on a photoconductive member and a digital scanning system (comprising a semiconductor laser, an optical scanner and the like in this embodiment) for forming additional information on a photoconductive member. The construction of the image forming apparatus disclosed in, for example, U.S. Pat. No. 4,931,882, can be used for that of the present invention. The digital scanning system forms a latent image corresponding to the additional information on the photoconductive member on the basis of image data from the image output device 7, and forms an image combined with the original document image on a recording medium. The constructions of the image forming apparatus disclosed in U.S. Pat. Nos. 4,931,882, 4,989,042 or Ser. No. 673,239 can be used for that of the present invention.

Reference numeral 102 denotes an operation panel, on which a mode setting key necessary for an image forming process, an indicator, an additional information input section for inputting handwritten information (characters, figures, illustrations, etc.) which is additional information, an indicator for displaying information inputted from the additional information input section, and the like are disposed. Reference numerals 103 denote paper feed sections, each of which is constructed so as to be capable of holding approximately 500 sheets of paper.

Figure 3:
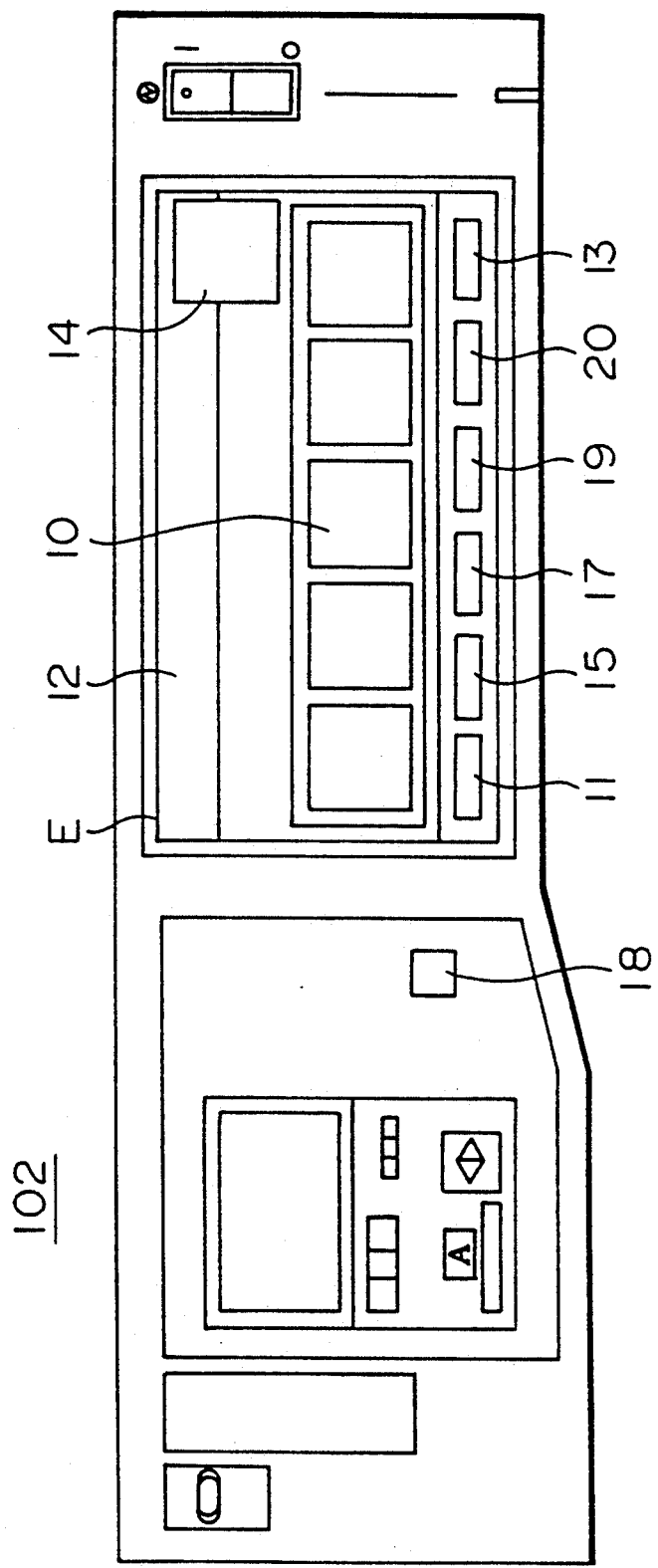
FIG. 3 is a plan view which illustrates the detailed construction of the operation panel shown in FIG. 2.

FIG. 3 is a plan view which illustrates the detailed construction of the operation panel 102 shown in FIG. 2. Reference numeral 11 denotes an input selection key. On the basis of input from the input selection key 11, the type of handwritten information (characters, figures, illustrations or the like) is designated. Reference numeral 12 denotes an output display device, on which type font data obtained by recognizing handwritten characters inputted to a handwriting input area 10 by a pattern recognition process, or a character string converted into kanji on the basis of the recognized type data, is displayed. As a result, when handwritten additional information, for example, Japanese Hiragana characters (phonetic characters) for " じゅうよう " (meaning in English: important) is recognized, the Hiragana characters for " じゅよう " are displayed on the output display device 12. Furthermore, when kanji (hieroglyphic characters) conversion is designated, Japanese kanji characters for "重要" (meaning in English: important) are displayed on the output display device 12. Reference numeral 14 denotes an output character size display section, on which a size of a character to be output is displayed in point numbers.

Reference numeral 15 denotes a conversion key. When the conversion key 15 is depressed in a condition in which the characters for " じゅよう " are being displayed on the output display device 12, the Hiragana characters are converted to kanji and the Japanese kanji characters for "重要" are displayed thereon. Reference numeral 17 denotes a key for changing a character size. When this key is depressed to change the character size of additional information to be output, the size of characters to be output is displayed in numerical data on an output character size display section 14. The character size may be displayed in the form of an image having a size corresponding to that of the character size. Reference numeral 18 denotes a handwriting input mode key. A handwriting input mode is set by depressing the handwriting input key 18. Reference numeral 19 denotes a vertical/horizontal writing selection key, which is depressed when it is desired to specify the direction in which characters are output. Reference numeral 20 denotes an output position setting key. An output reference position (a document abutment position) and a starting point of output paper are set by depressing the output position setting key 20. Reference numeral 13 denotes a character recognition confirmation key.

Referring to FIGS. 4 to 13, the operation for inputting additional information of the image forming apparatus of the present invention will be explained below.

FIGS. 4 to 13 are schematic views which illustrate the operation for inputting additional information of the image forming apparatus of the present invention.

Figure 4:
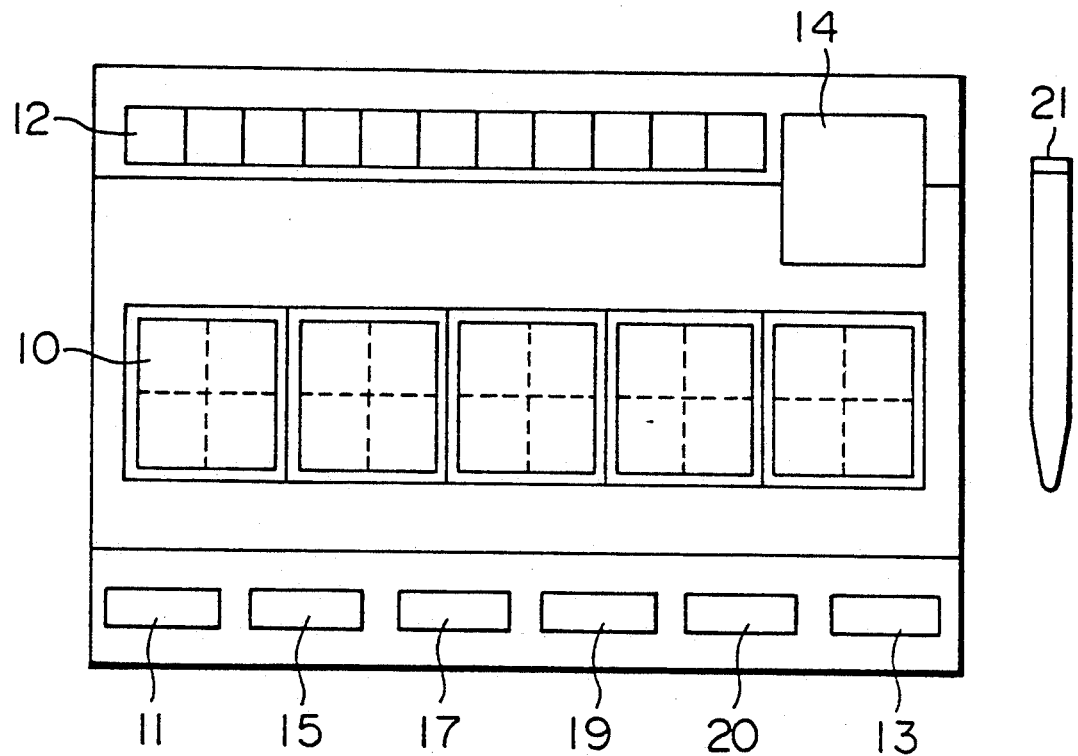
FIG. 4 is a schematic view which illustrates the operation of inputting/outputting additional information according to the image forming apparatus of the present invention.

When the handwriting input mode is selected and set by depressing the handwriting input key 18 of the operation panel 102, an initial input display screen (a character input display screen) shown in FIG. 4 is displayed. In the copy mode, the handwriting input device is usually turned off in a state in which it is in the handwriting input mode in order to reduce the amount of power consumed by the handwriting input device and to lengthen the service life of the handwriting input device.

Figure 6:
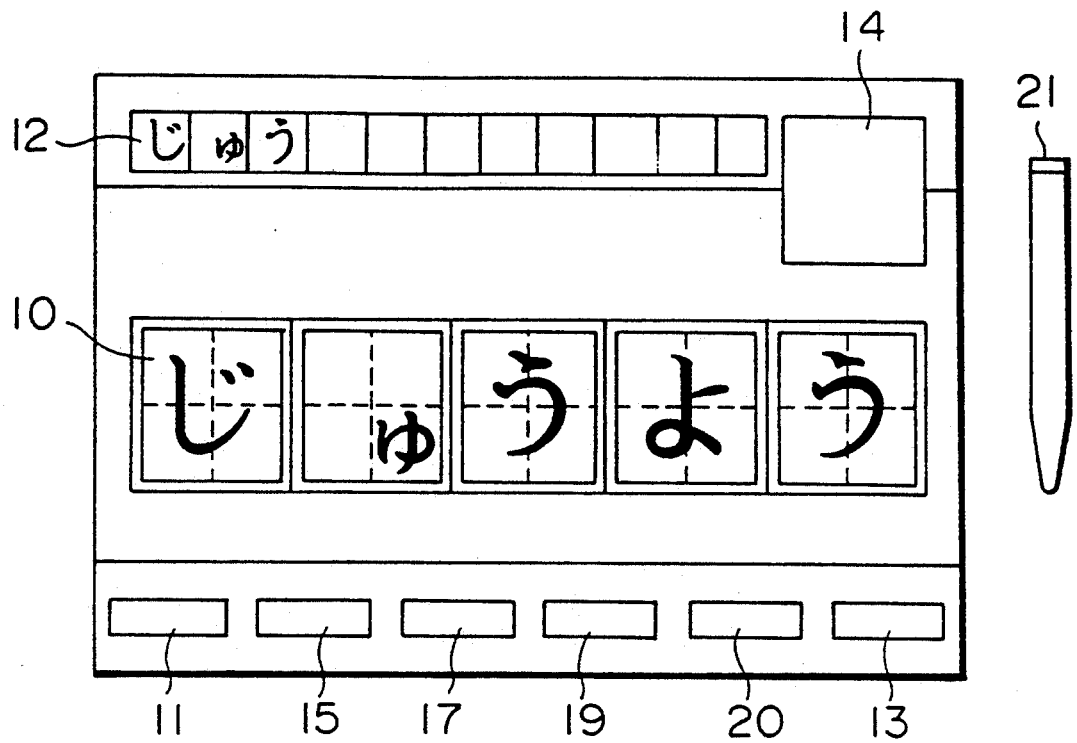
Figure 7:
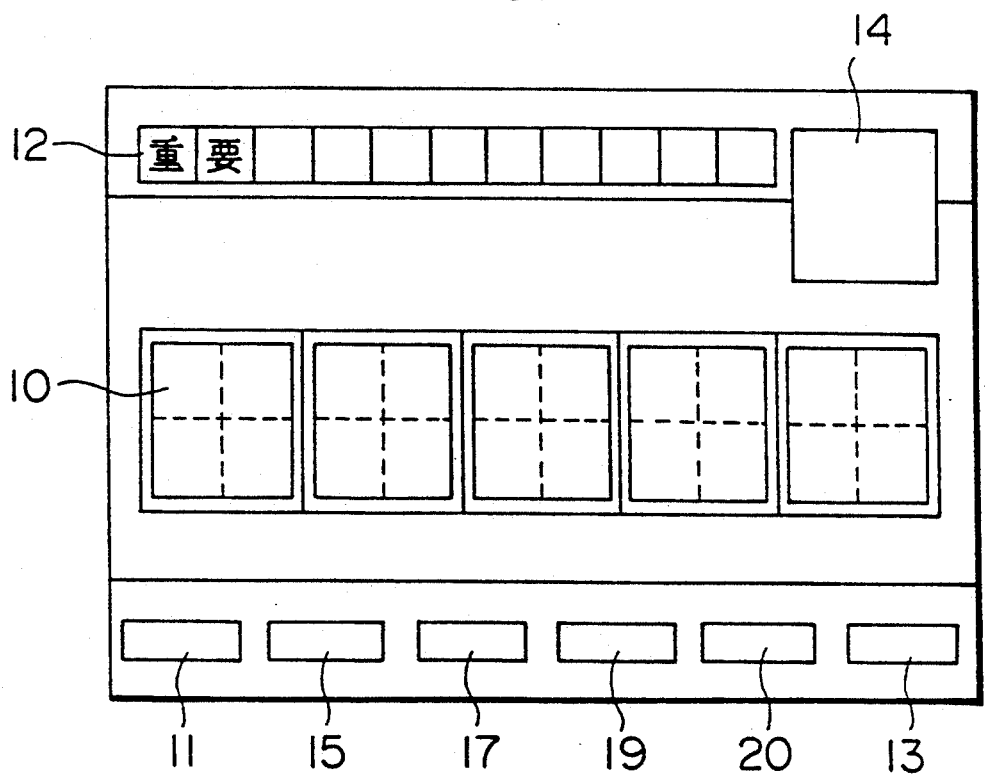
Figure 9:
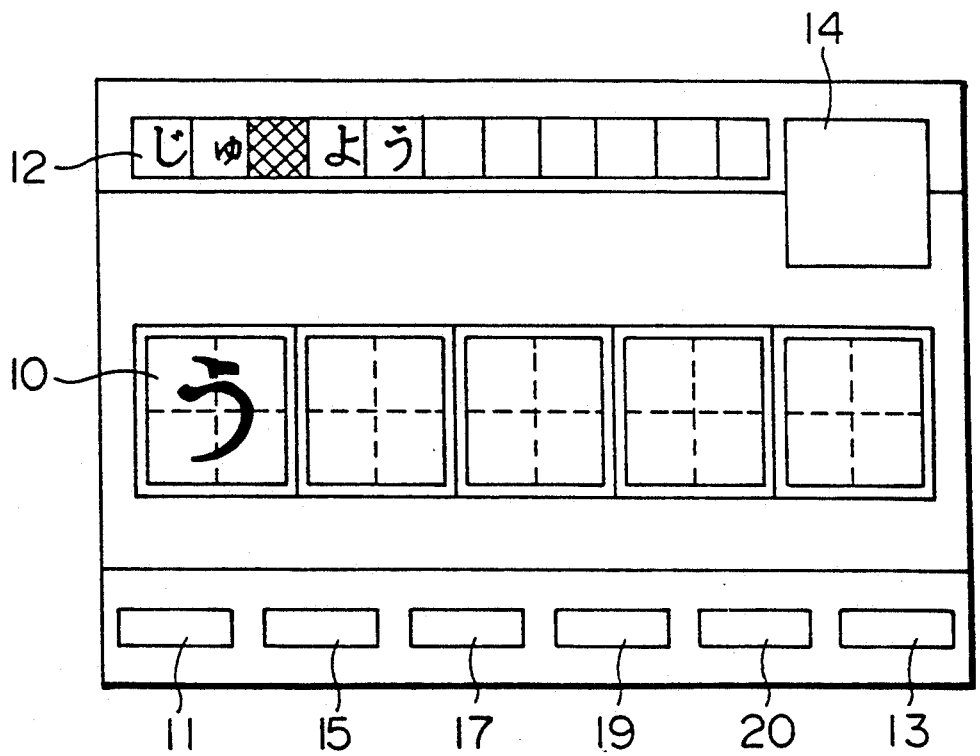
Figure 10:
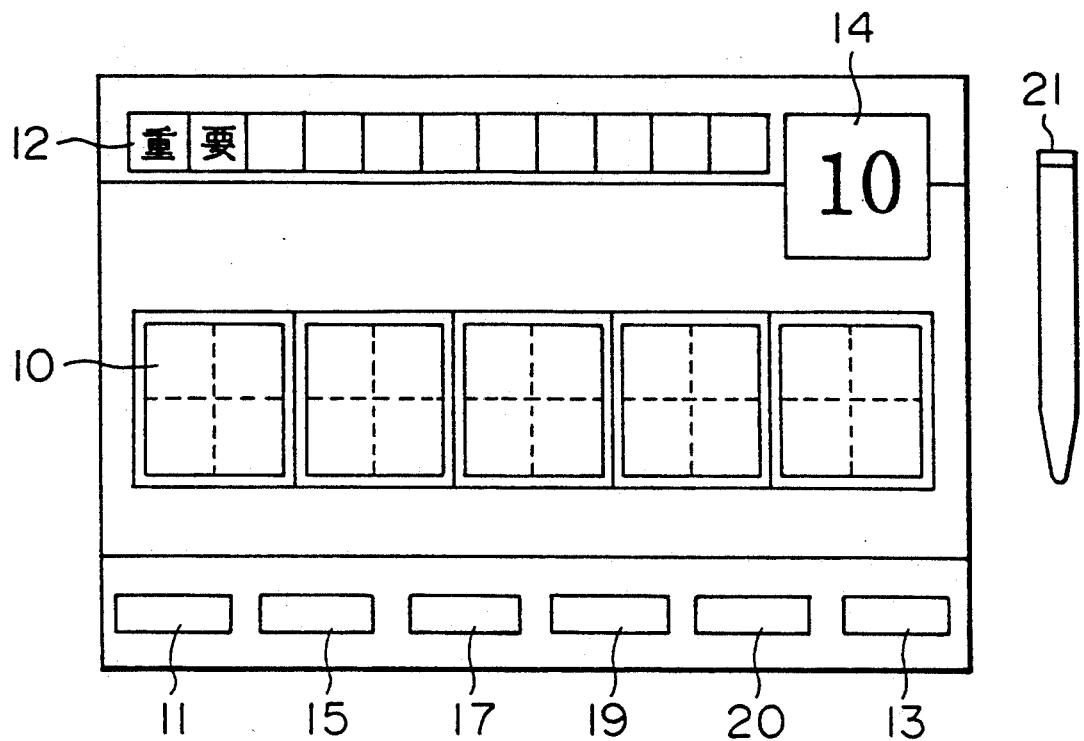
Figure 11:
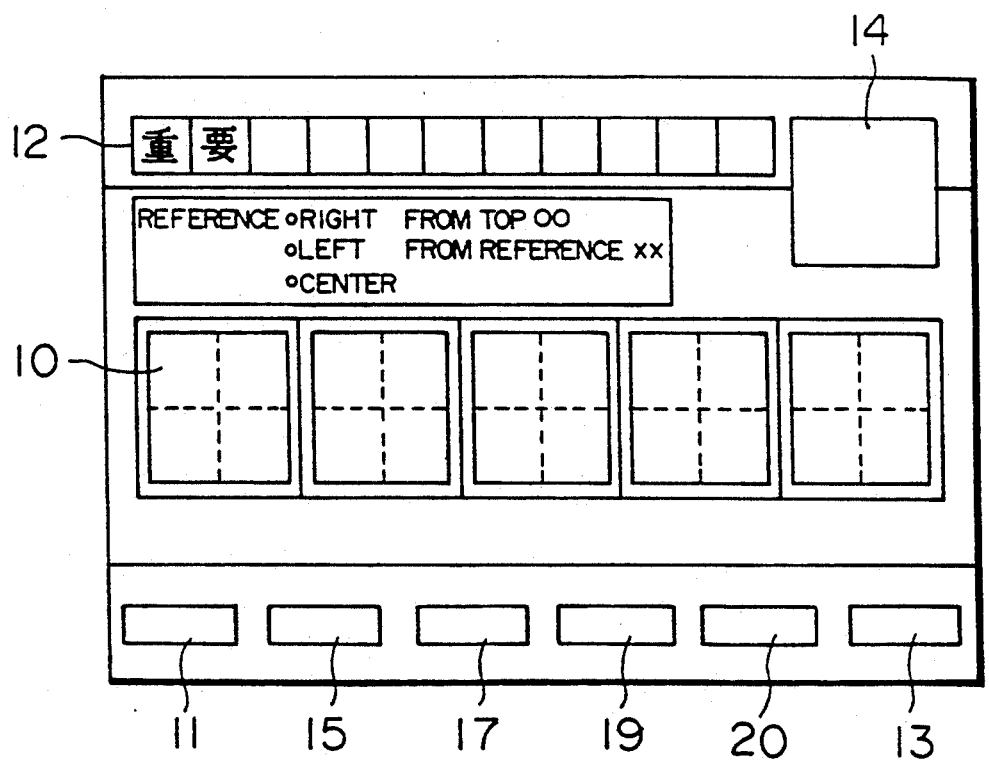
Figure 12:
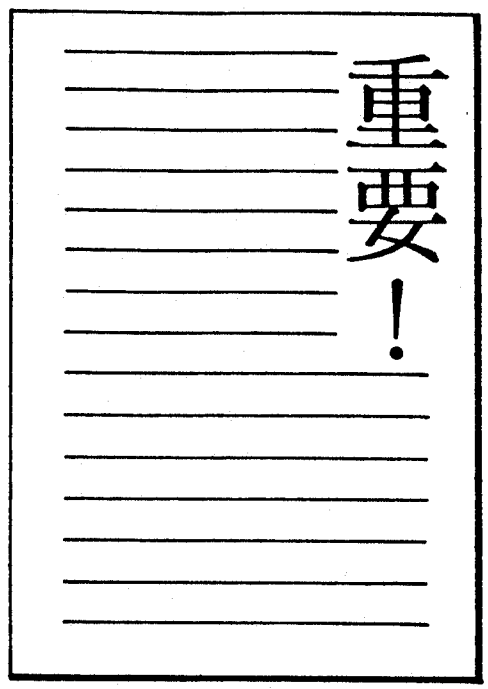

An explanation will be given below concerning an example of a step in which handwritten input characters are recognized by a pattern recognition process in a character input display screen shown in FIG. 4 whereby the Hiragana characters are converted into kanji and displayed. As shown in FIG. 6, upon inputting of one Hiragana character into one frame (one frame is further divided into, for example, four portions) of the handwriting input area 10 by using an input pen 21 shown in FIG. 4, recognition of the character inputted to the frame is started after a lapse of a predetermined time from when the inputting of the character to the frame was finished. Characters which are recognized are in turn output at positions corresponding to the frames of the input area of the output display device 12. At this point, when the conversion key 15 is depressed, the Hiragana characters for " ひょうじ " are converted to kanji and displayed on the output display device 12, as shown in FIG. 7. When an erroneous recognition occurs during the above-mentioned character recognition, one of the Hiragana characters, shown in FIG. 8, displayed on the output display device 12, is displayed in reverse shading by depressing the character recognition confirmation key 13 to specify the erroneously recognized character. The Hiragana character which is displayed in reverse shading shifts each time the character recognition confirmation key 13 is depressed. The display is then switched to a display shown in FIG. 9, onto which handwritten characters can be entered again. When the character cannot be recognized, a corresponding portion of the output display device 12 is also displayed in reverse shading. When recognition of handwritten characters which are input as additional information is finished, a desired mode is selected by the vertical/horizontal writing selection key 19. If necessary, the character size is changed using point numbers by using the key 17 for changing a character size as shown in FIG. 10. Point numbers may be input from a ten-key numeric input pad. The positioning of copy paper onto which copy is made, can be performed by setting an output reference position and the position from the top of output paper by using the output position setting key 20, as shown in FIG. 11. When output is made on the basis of the above setting, the output is as shown in FIG. 12.

Figure 5:
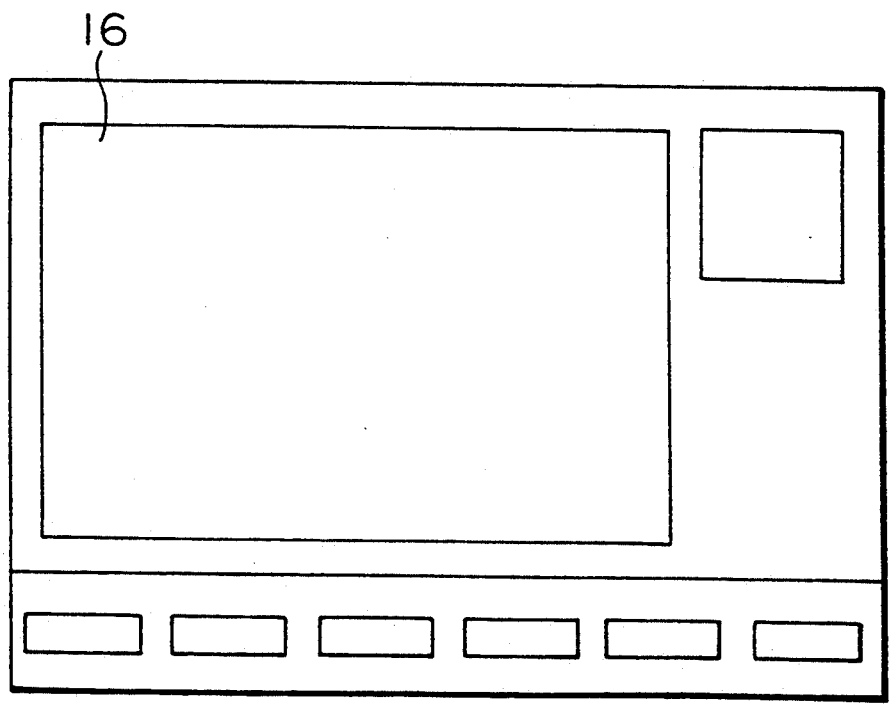
FIGS. 5 through 13 are representational views which illustrate the operation of inputting/outputting additional information according to the image forming apparatus of the present invention.
Figure 13:
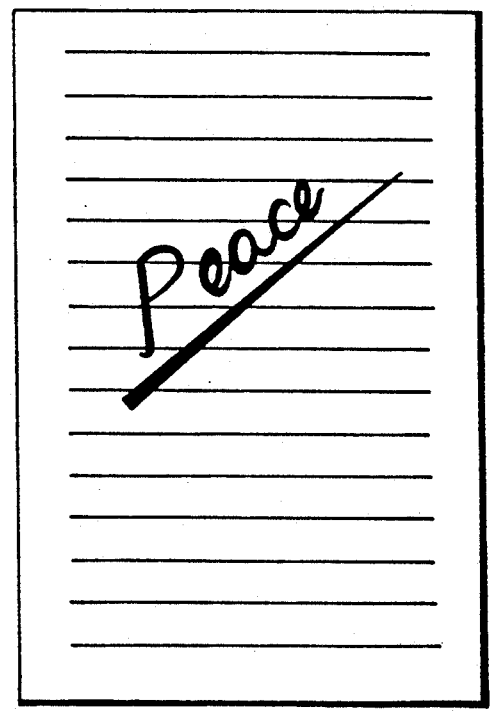

Another handwriting input will now be explained. In FIG. 5, reference numeral 16 denotes an image input area which will be described later. The image input area is set to an additional information input area E formed from a touch panel and displayed thereon according to a condition in which the input selection key 11 is depressed. When the apparatus enters the image input mode by using the input selection key 11, the display screen of the input device is as shown in FIG. 5, and the input display screen becomes a picture drawing display screen 16 for illustrations or the like. The input image data can be reproduced on the copy paper as it is originally handwritten. The setting for particulars is the same as described above. Although in the above-described embodiment, a case in which characters and illustrations are processed as additional information independently of each other was explained, it becomes possible to add the additional information combined with the characters, illustration or the like to the original document image by forming writing attributes (AND, OR, XOR, and the like) of both in such a manner as to be definable as shown in FIG. 13.

Referring to the flowchart shown in FIG. 14, the operation of editing and outputting additional handwritten information will be explained below.

Figure 14:
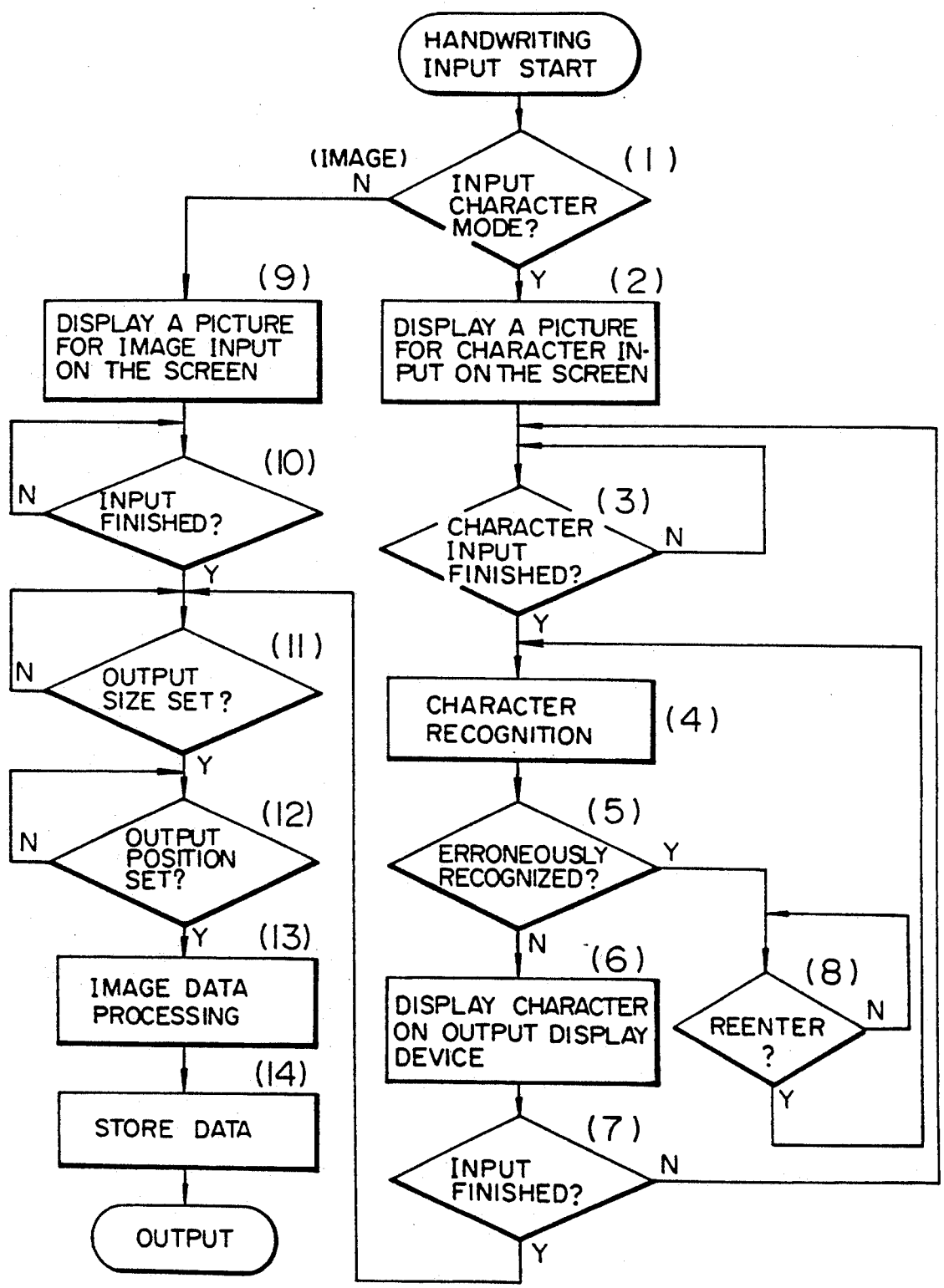
FIG. 14 is a flowchart which illustrates an example of a sequence of an additional information editing and outputting process according to the image forming apparatus of the present invention.

FIG. 14 is a flowchart which illustrates an example of a sequence of an additional information editing and outputting process in the image forming apparatus according to the present invention. Reference numerals 1 to 14 each denote a step.

Figure 8:
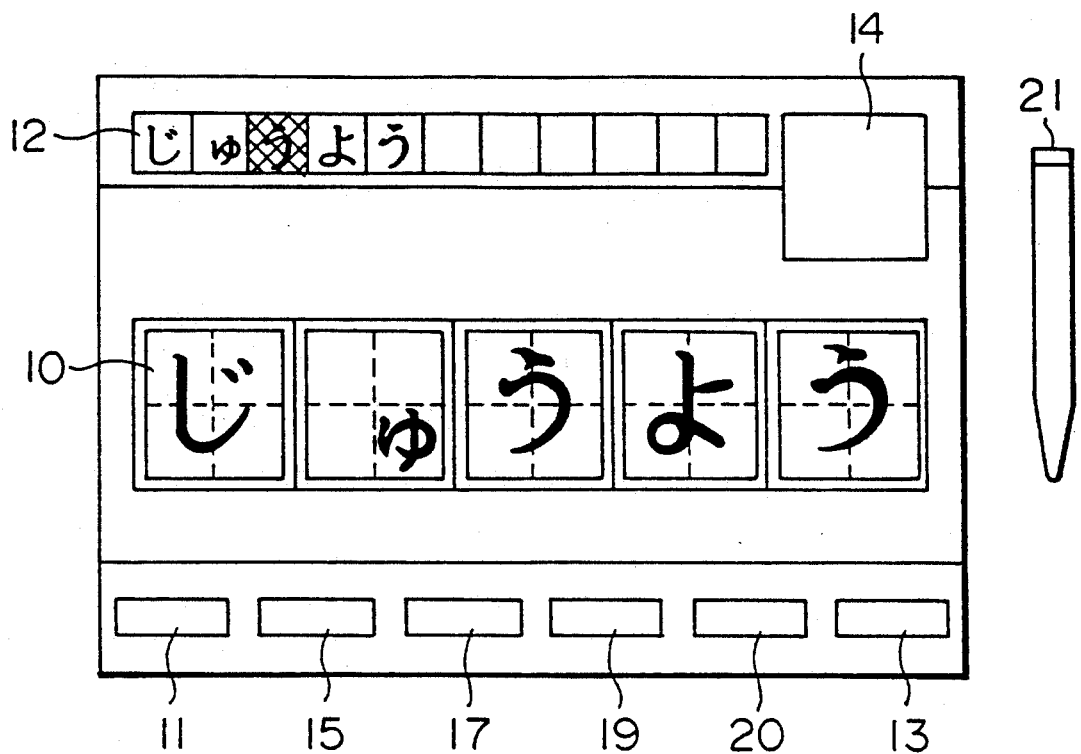

First, it is determined whether the set handwriting input mode is a character input mode (step 1). If the set handwriting input mode is a character input mode, a character input display screen (see FIG. 4) is displayed (step 2). Next, the image forming apparatus waits for a predetermined time (step 3) for the inputting of characters to be finished. When the inputting of characters is finished, a character recognition process, which will be described later, is performed frame by frame (step 4). It is then determined whether there are any characters which could not been recognized, or whether the character recognition confirmation key 13 has been depressed (step 5). When either one of the above has occurred, the erroneously input portion is displayed in reverse shading, as shown in FIG. 8. As shown in FIG. 9, the image forming apparatus waits for characters to be handwritten and input again only at corresponding portions (step 8). If the input is made, the process returns to step 4.

In contrast, when neither the depression of the recognition key 13 nor the erroneous display of the characters has occurred in step 5, recognized type-font data is displayed on the output display device 12 (step 6). It is then determined whether inputting of handwriting characters is finished (step 7). When inputting of handwriting characters has not been finished, the process returns to step 3; and when finished, the process proceeds to step 11 and the subsequent steps which follow.

On the other hand, when it is determined in step 1 that the set handwriting input mode is not a character input mode, the image forming apparatus enters the image input mode, and a display screen shown in FIG. 5 (step 9) is formed. Next, the image forming apparatus waits for handwritten illustrations, signatures or the like to be input (step 10). When the input is made, the image forming apparatus waits for the output size to be set (step 11). Furthermore, the image forming apparatus waits for an output position to be specified by the output position setting key 20 (step 12). When the inputting of the output position is finished, predetermined image data processing (magnification, movement, trimming, character modification or the like) is performed (step 13). Processed additional information is stored in the output information storage device 5 shown in FIG. 1 (step 14).

When the additional information is combined with the manuscript image and copied in practice, if the copy key is depressed in the handwriting input mode, the additional information stored in the output information storage device 5 is output from the image output device, and a combined copy of the original document image and the additional information is formed.

Figure 15:
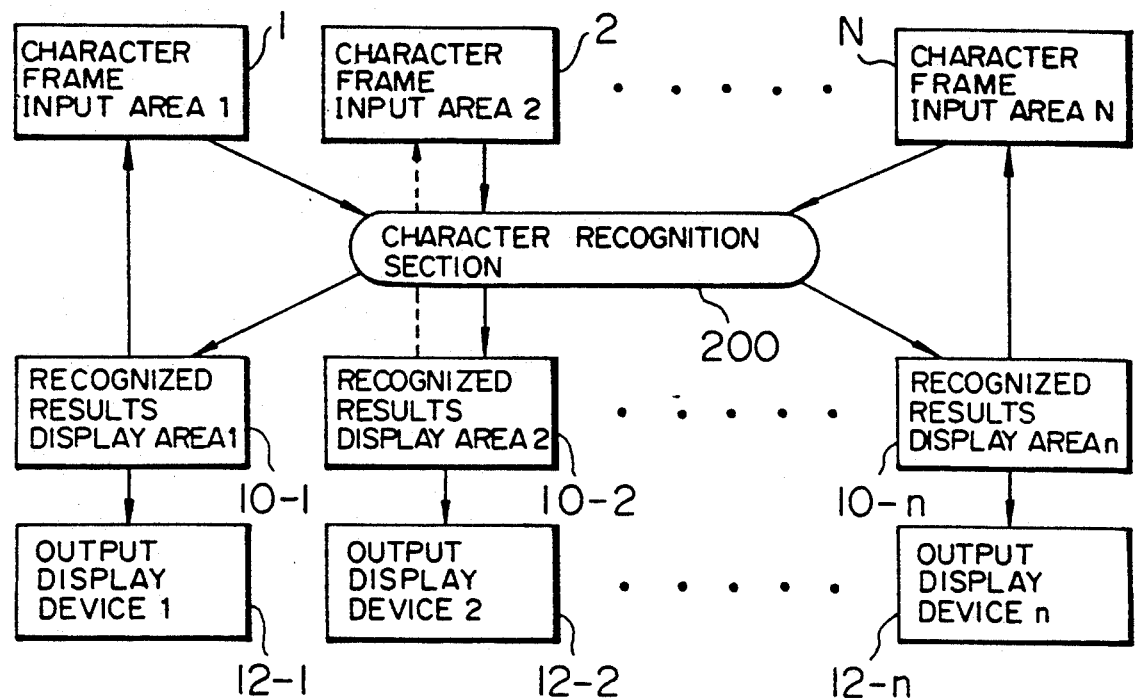
FIG. 15 is a block diagram which illustrates the character recognition processing configuration of the image forming apparatus according to the present invention.
Figure 16:
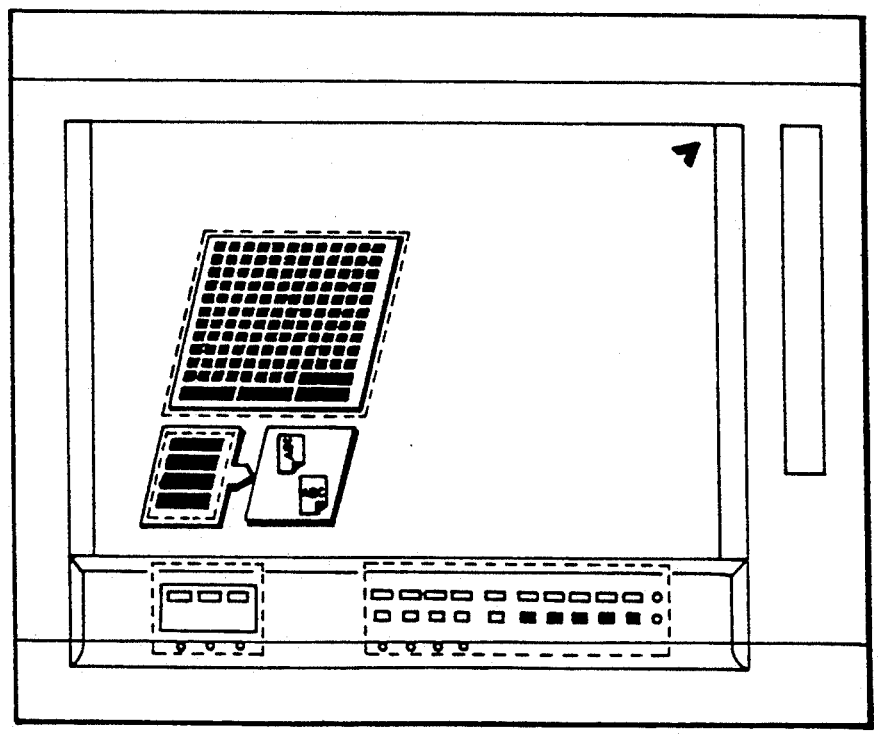
FIG. 16 is a plan view which illustrates an example of a conventional image forming apparatus.

FIG. 15 is a block diagram which illustrates the character recognition processing configuration of the image forming apparatus according to the present invention. Character frame input areas 1 to N corresponding to the number frames of the handwriting input area 10 shown in FIG. 4 are formed. Information inputted to the character frame input areas 1 to N is displayed as an image on recognized results display areas 10-1 to 10-n. Type font data recognized by a character recognition section 200 by analyzing the images displayed on the recognized results display areas 10-1 to 10-n by referring to patterns which are entered beforehand are displayed as additional information on the output display devices 12-1 to 12-n.

Although in the above-described embodiment a case in which handwritten information is directly input and output as additional information on a original document image was explained, handwritten characters or illustrations on a original document or plain paper, characters or illustrations of a magazine, or the like may be specified by a selecting means, such as a marker pen, and thereafter these characters or the like may be read out as image information by using an image scanner. A recognition process similar to that in the above-described embodiment may be performed on the read-out information to determine the additional information.

That is, the original document image is read out by an image scanner, and the character in an area designated for the original document is recognized. A type-font data pattern corresponding to the recognized character is output. A character image is fromed on a photoconductive member by using the above-mentioned digital optical system, and the character image is transferred to recording paper. The recording paper is accomodated in an unillustrated intermediate tray. The original document is exposure-scanned, and the original document image is formed on the photoconductive member by using the above-described analog optical system. At this time, the portions of the characters of the original document are erased by the digital optical system. The original document image is transferred to the recording paper fed from the intermediate tray in a well-known multitransfer process.

When a digital copying machine disclosed in the above-mentioned U.S. Pat. No. 4,989,042 is used, a type-font data pattern is temporarily stored in a memory. Then, when the original document image is read out again to form an image on the basis of the image signals of the original document, the image may be formed on the basis of the type font data pattern stored in memory in place of the image signals from the character area of the original document.

Regarding a manuscript to be combined, the recognized characters may be those of the written original document or other documents. In addition, graphic patterns or images other than type fonts may be generated instead of generating type font data patterns of recognized characters. Furthermore, when specific characters are recognized, graphic patterns or images may be generated.

Although in the above-described embodiment a case in which all characters are handwritten and input as additional information was explained, a mini-keyboard for inputting character information may be disposed on the operation section. A multiplicity of character information can be input in a short period of time by the mini-keyboard permitting a desired character string to be input according to a predetermined character input system. The above-described outputting process is performed on the basis of the additional information formed of a combination of handwritten characters and type font characters. On the occasion of the output, handwritten character fonts, character fonts selected from character fonts of a plurality of type styles or the like, may be output as the additional information. In addition, images stored, for example, in a floppy disk of an electronic still camera, may also be used as additional information by making it possible to input image data through an external interface means.

Although in the above-described embodiment a case in which Japanese characters are handwritten and input was explained, the present invention can be applied to cases where English or other languages are used. In the case where English is used, type styles may be changed by operating the conversion key 15, for example, Gothic type is changed to Italic type.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded a broad interpretation, so as to encompass all such modifications and equivalent structures and functions.

What is claimed is:

1. An image forming apparatus comprising:
    input means for inputting handwritten characters;
    character recognition means for recognizing hand written characters inputted from said input means;
    generating means for generating character pattern data representing the character recognized by the character recognition means, said generating means generating character pattern data in a desired one of a plurality of typefaces for said recognized character;
    scanning means for generating scanned image data by scanning an original document;
    combining means for combining the generated character pattern data of a desired typeface with the scanned image data into combined image data; and
    image forming means for forming an image from the combined image data.

2. An image forming apparatus according to claim 1, further comprising position setting means for setting a position for the character pattern data.

3. An image forming apparatus according to claim 1, further comprising size setting means for setting an output size of the character pattern data.

4. An image forming apparatus according to claim 1, further comprising displaying means for displaying the character recognized by the character recognition means.

5. An image forming apparatus comprising:
- reading means for reading an image of an original document on which characters are written;
- character recognizing means for recognizing characters written on the original document read by the reading means;
- generating means for generating an image pattern on the basis of the characters recognized by the character recognizing means; and
- image forming means for forming an image without the recognized characters by combining an image of the original document with image patterns of the recognized characters generated by the generating means.

6. An image forming apparatus according to claim 5, further comprising scanning means for expose-scanning an original document, wherein said scanning means performs a first scanning operation for recognizing characters written on the original document and a second scanning operation for forming the image of the original document.

7. An image forming apparatus according to claim 5, wherein the generating means generates a type-font data pattern corresponding to the recognized character type.

8. An image forming apparatus according to claim 5, wherein the generating means generates a graphic pattern corresponding to the recognized character type.

9. An image forming apparatus comprising:
- a designating means for designating a desired character area of an original document on which characters are written;
- reading means for reading said original document;
- character recognizing means for recognizing characters in a desired character area designated by said designating means in accordance with outputs from said reading means;
- generating means for generating an image pattern on the basis of the characters recognized by the character recognizing means; and
- image forming means for forming a combined image of an image of an original document read by said reading means with the image patterns generated by the generating means.

10. An image forming apparatus according to claim 9, wherein an original document combined by said image forming means is different from said original document on which characters are written.

11. An image forming apparatus according to claim 9, wherein the generating means generates a type-font data pattern corresponding to the recognized character.

12. An image forming apparatus according to claim 9, wherein the generating means generates a graphic pattern corresponding to the recognized character.

13. An image forming apparatus comprising:
- input means for inputting handwritten characters;
- character recognition means for recognizing handwritten characters input by said input means;
- generating means for generating character pattern data representing the recognized character, said generating means generating character pattern data in a desired one of a plurality of typefaces for the recognized character; and
- image forming means for forming an image of the generated character pattern of a desired typeface on a recording medium.

* * * * *